United States Patent
Raman et al.

(10) Patent No.: US 10,379,871 B2
(45) Date of Patent: Aug. 13, 2019

(54) OPERATING SYSTEM STARTUP ACCELERATION

(71) Applicant: Harman International Industries, Incorporated, Stamford, CT (US)

(72) Inventors: Prakash Raman, Bangalore (IN); Pranjal Chakraborty, Bangalore (IN); Eugine Varghese, Bangalore (IN)

(73) Assignee: Harman International Industries, Incorporated, Stamford, CT (US)

( * ) Notice: Subject to any disclaimer, the term of this patent is extended or adjusted under 35 U.S.C. 154(b) by 97 days.

(21) Appl. No.: 15/324,258

(22) PCT Filed: Jul. 9, 2015

(86) PCT No.: PCT/US2015/039735
§ 371 (c)(1),
(2) Date: Jan. 5, 2017

(87) PCT Pub. No.: WO2016/007737
PCT Pub. Date: Jan. 14, 2016

(65) Prior Publication Data
US 2017/0168848 A1 Jun. 15, 2017

(30) Foreign Application Priority Data

Jul. 10, 2014 (IN) .......................... 3427/CHE/2014

(51) Int. Cl.
*G06F 9/00* (2006.01)
*G06F 9/24* (2006.01)
(Continued)

(52) U.S. Cl.
CPC ........ *G06F 9/4406* (2013.01); *G06F 9/44521* (2013.01); *G06F 9/45558* (2013.01); *G06F 2009/45575* (2013.01)

(58) Field of Classification Search
None
See application file for complete search history.

(56) References Cited

U.S. PATENT DOCUMENTS

| 8,141,075 B1* | 3/2012 | Chawla ............... G06F 9/45558 718/1 |
| 2003/0126310 A1* | 7/2003 | Ryzhov ................... G06F 9/454 719/328 |

(Continued)

FOREIGN PATENT DOCUMENTS

| CN | 103488478 A | 1/2014 |
| EP | 2019357 A1 | 1/2009 |

(Continued)

OTHER PUBLICATIONS

ISA European Patent Office, International Search Report and Written Opinion Issued in Application No. PCT/US2015/039735, dated Oct. 19, 2015, WIPO, 9 pages.

(Continued)

*Primary Examiner* — Nitin C Patel
(74) *Attorney, Agent, or Firm* — McCoy Russell LLP

(57) ABSTRACT

Example methods and systems for selectively initializing elements of an operating system of a computing device are disclosed. In some examples, a method of selectively loading classes during an initialization of an operating system of a computing device comprises initializing a virtual machine, loading classes selected from a first class list, and loading resources. The method further includes loading a service-loading process configured to initialize services of the operating system and register the services with a service manager, and loading classes selected from a second class list after loading the service-loading process.

19 Claims, 8 Drawing Sheets

(51) Int. Cl.
*G06F 15/177* (2006.01)
*G06F 9/4401* (2018.01)
*G06F 9/455* (2018.01)
*G06F 9/445* (2018.01)

(56) References Cited

U.S. PATENT DOCUMENTS

| | | | | |
|---|---|---|---|---|
| 2005/0108511 | A1* | 5/2005 | Zimmer | G06F 9/4411 |
| | | | | 713/1 |
| 2006/0277402 | A1* | 12/2006 | Wakabayashi | G06F 9/445 |
| | | | | 713/1 |
| 2007/0226719 | A1* | 9/2007 | Park | G06F 9/485 |
| | | | | 717/151 |
| 2009/0024562 | A1* | 1/2009 | Lee | G06F 9/445 |
| 2009/0063837 | A1* | 3/2009 | Shayer | G06F 9/4401 |
| | | | | 713/2 |
| 2010/0198508 | A1* | 8/2010 | Tang | G01C 21/3469 |
| | | | | 701/414 |
| 2012/0173075 | A1* | 7/2012 | Mays | B60W 10/06 |
| | | | | 701/34.2 |
| 2013/0036299 | A1* | 2/2013 | Itoh | G06F 9/4401 |
| | | | | 713/2 |
| 2015/0127833 | A1* | 5/2015 | Hegdal | G06F 9/5016 |
| | | | | 709/226 |

FOREIGN PATENT DOCUMENTS

| | | |
|---|---|---|
| JP | 2011096145 A | 5/2011 |
| JP | 2012234539 A | 11/2012 |
| JP | 2013033369 A | 2/2013 |

OTHER PUBLICATIONS

Mednieks, Z. et al., "Programming Android," O'Reilly Media Inc., Feb. 16, 2012, Sebastopol, California, 7 pages.

Shuichi, M., "Easy Java introduction for Android application development," Technology Review Company, ISBN: 978-4-7741-4988-2, Feb. 25, 2012, 7 pages. (Submitted with Machine Translated English Abstract).

Japanese Patent Office, Office Action Issued in Application No. 2017-500386, dated Mar. 18, 2019, 20 pages.

* cited by examiner

OPERATING SYSTEM STARTUP ACCELERATION

CROSS-REFERENCE TO RELATED APPLICATIONS

The present application is a U.S. National Phase of International Patent Application Serial No. PCT/US2015/039735, entitled "OPERATING SYSTEM STARTUP ACCELERATION," filed on Jul. 9, 2015. International Patent Application Serial No. PCT/US2015/039735claims priority to Indian Patent Application No. 3427/CHE/2014, entitled "OPERATING SYSTEM STARTUP ACCELERATION," filed on Jul. 10, 2014. The entire contents of the above-identified applications are hereby incorporated by reference for all purposes.

FIELD

The disclosure relates to accelerating an initialization routine for an operating system of a computing device.

BACKGROUND

Operating systems for computing devices may perform an initialization routine to start up necessary services, resources, and drivers for using hardware components of the computing devices. The initialization routine speed may be based on the number of services, resources, and drivers that are loaded, and some functionality of the computing device may not be available until the initialization routine completes.

SUMMARY

An acceptable amount of delay between powering on a computing device and initializing an operating system/applications of the computing device may vary based on an environment and/or usage of the computing device. For example, computing devices that are utilized within a vehicle may have stricter delay considerations (e.g., a smaller acceptable amount of delay) than personal computing devices, as the functionality of an in-vehicle computing device may affect functionality of the vehicle, safety features, etc. Embodiments are disclosed for methods and systems for speeding up an initialization routine for a computing device. In some embodiments, a method of selectively loading classes during an initialization of an operating system of a computing device comprises initializing a virtual machine, loading classes selected from a first class list, and loading resources of the computing device. The method further includes loading a service-loading process configured to initialize services of the operating system and register the services with a service manager, and loading classes selected from a second class list after loading the service-loading process.

In some embodiments, a computing device for initializing an operating system may include a processor and a storage device storing instructions executable by the processor to initialize a virtual machine, load classes selected from a first class list, and load resources of the computing device. The instructions may be further executable to load a service-loading process configured to initialize services of the operating system and register the services with a service manager, and load classes selected from a second class list after loading the service-loading process.

In some embodiments, an in-vehicle computing device comprises a processor including one or more processing cores, and a storage device storing instructions for initializing an operating system of the in-vehicle computing device, the instructions being executable by the processor to initialize a virtual machine, load each class of a first class list using a processor thread pool, a number of threads in the processor thread pool being based on a number of processor cores included in the processor, and load resources of the in-vehicle computing device using the processor thread pool. The instructions may be further executable to load a service-loading process configured to initialize services of the operating system and register the services with a service manager, and load classes selected from a second class list after loading the service-loading process using the processor thread pool.

BRIEF DESCRIPTION OF THE DRAWINGS

The disclosure may be better understood from reading the following description of non-limiting embodiments, with reference to the attached drawings, wherein below.

DETAILED DESCRIPTION

As described above, the speed of an initialization routine may define a delay between starting up a computing device and enabling functionality of the computing device. For example, a computing device within a vehicle (e.g., an in-vehicle computing device) may be started responsive to starting the vehicle, however functionality such as navigation systems, audio controls, etc. may not be accessible until the computing device completes the initialization routine. The present disclosure recognizes that some initialization routines may load classes, resources, services/applications, and hardware instances associated with particular hardware drivers that are not necessary for initial operation of the computing device. As the loading of each of these elements increases the initialization time for the computing device, selectively loading these elements may allow the computing device to be initialized more efficiently, thereby reducing a delay in availability of the device. The methods and systems described below enable the selection of classes, resources, services, applications, and hardware instances to be configured based on a priority of each element derived from considerations such as device characteristics, intended use of the device, prior use of the device, requested functionality, criticality/dependencies of the element regarding the functionality of the device/initialization routine/applications, etc. In this way, the loading/initialization of features may be intelligently selected to reduce an initialization time without sacrificing functionality of the computing device.

Figure 1:
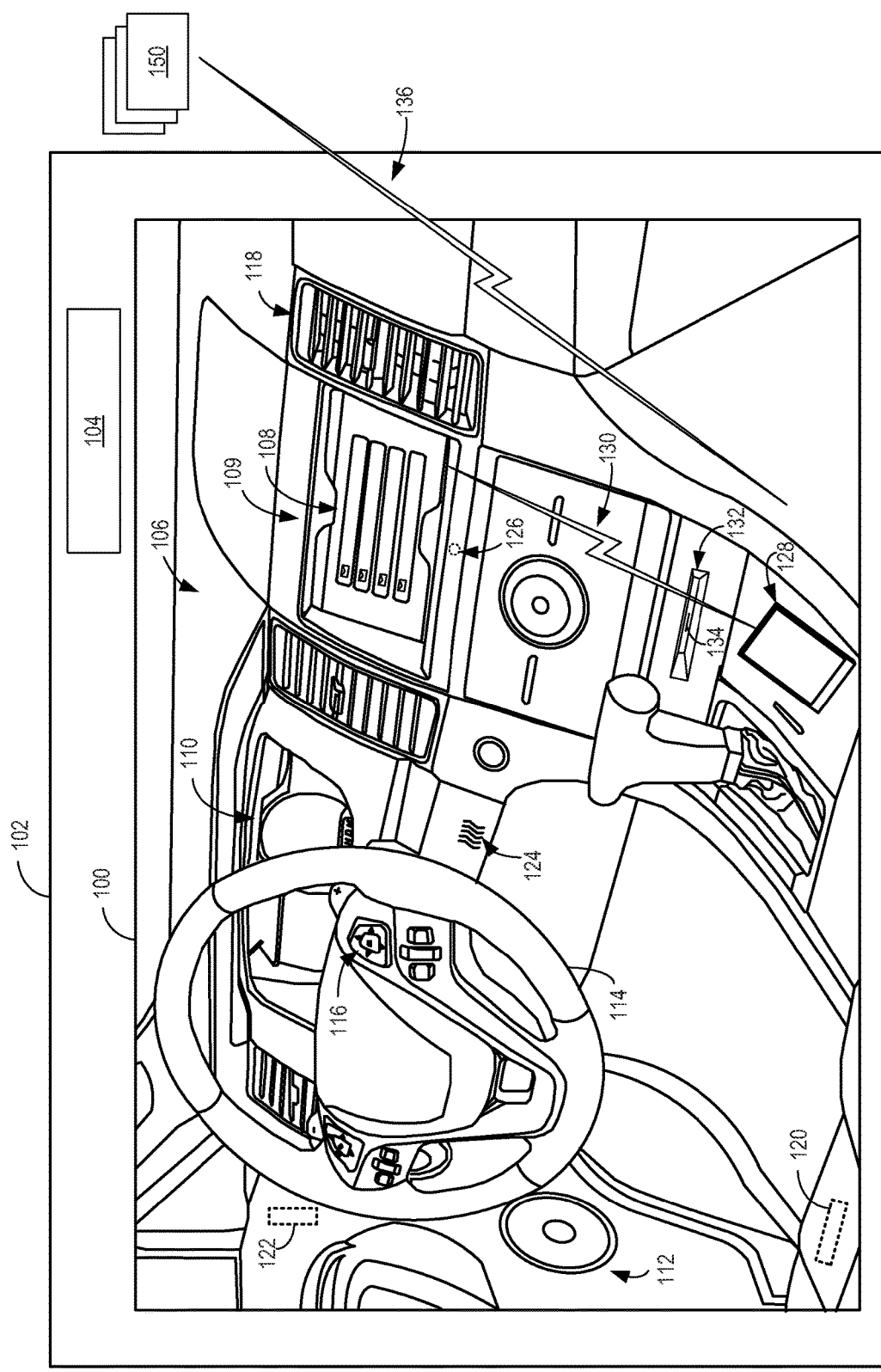
FIG. 1 shows an example partial view of an interior of a cabin of a vehicle in accordance with one or more embodiments of the present disclosure.

FIG. 1 shows an example partial view of one type of environment: an interior of a cabin 100 of a vehicle 102, in which a driver and/or one or more passengers may be seated. Vehicle 102 of FIG. 1 may be a motor vehicle including drive wheels (not shown) and an internal combustion engine 104. Internal combustion engine 104 may include one or more combustion chambers which may receive intake air via an intake passage and exhaust combustion gases via an exhaust passage. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

As shown, an instrument panel 106 may include various displays and controls accessible to a driver (also referred to as the user) of vehicle 102. For example, instrument panel 106 may include a touch screen 108 of an in-vehicle computing system 109 (e.g., an infotainment system), an audio system control panel, and an instrument cluster 110. While the example system shown in FIG. 1 includes audio system controls that may be performed via a user interface of in-vehicle computing system 109, such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system 109 may adjust a radio station selection, a playlist selection, a source of audio input (e.g., from radio or CD or MP3), etc., based on user input received directly via touch screen 108, or based on data regarding the user (such as a physical state and/or environment of the user) received via external devices 150 and/or mobile device 128.

In some embodiments, one or more hardware elements of in-vehicle computing system 109, such as touch screen 108, a display screen, various control dials, knobs and buttons, memory, processor(s), and any interface elements (e.g., connectors or ports) may form an integrated head unit that is installed in instrument panel 106 of the vehicle. The head unit may be fixedly or removably attached in instrument panel 106. In additional or alternative embodiments, one or more hardware elements of the in-vehicle computing system may be modular and may be installed in multiple locations of the vehicle. The in-vehicle computing system 109 may include a processor and memory (e.g., a storage device) storing instructions executable by the processor to perform various actions, tasks, etc. For example, the memory of in-vehicle computing system 109 may store an operating system for managing applications of the in-vehicle computing system and other data processing, control, and actions performed by the in-vehicle computing system.

Instrument cluster 110 may include various gauges such as a fuel gauge, tachometer, speedometer, and odometer, as well as indicators and warning lights. A steering wheel 114 may project from the instrument panel below instrument cluster 110. Optionally, steering wheel 114 may include controls 116 which may be used in conjunction with touch screen 108 to navigate features of an in-vehicle computing system and to control the in-vehicle computing system. In addition to the components depicted in FIG. 1, it will be appreciated that instrument panel 106 may include additional components such as door and window controls, a cigarette lighter which may also be used as a low-voltage power outlet, a glove compartment, and/or any other suitable elements. In one or more embodiments, control of in-vehicle climate (such as cabin temperature) via climate control system vents 118 may be performed using touch screen 108 and thus no separate climate control interface may be included in instrument panel 106. In alternative embodiments, however, a separate climate control interface may be provided.

The cabin 100 may include one or more sensors for monitoring the vehicle, the user, and/or the environment. For example, the cabin 100 may include one or more seat-mounted pressure sensors 120 configured to measure the pressure applied to the seat to determine the presence of a user. The cabin 100 may include one or more door sensors 122 configured to monitor door activity, such as the opening and/or closing of the door, the locking of the door, the operation of a window of the door, and/or any other suitable door activity event. A humidity sensor 124 may be included to measure the humidity content of the cabin. A microphone 126 may be included to receive user input in the form of voice commands, to enable a user to conduct telephone calls, and/or to measure ambient noise in the cabin 100. It is to be understood that the placement of the sensors illustrated in FIG. 1 is exemplary, and one or more additional or alternative sensors may be positioned in any suitable location of the vehicle. For example, additional sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as from sensors coupled to external devices 150 and/or mobile device 128.

Cabin 100 may also include one or more user objects, such as mobile device 128, that are stored in the vehicle before, during, and/or after travelling. The mobile device may include a smart phone, a tablet, a laptop computer, a portable media player, and/or any suitable mobile computing device. The mobile device 128 may be connected to the in-vehicle computing system via communication link 130. The communication link 130 may be wired (e.g., via Universal Serial Bus [USB], Mobile High-Definition Link [MHL], High-Definition Multimedia Interface [HDMI], etc.) or wireless (e.g., via BLUETOOTH, WI-FI, Near-Field Communication [NFC], cellular connectivity, etc.) and configured to provide two-way communication between the mobile device and the in-vehicle computing system. For example, the communication link 130 may provide sensor and/or control signals from various vehicle systems (such as vehicle audio system, climate control system, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device.

While the mobile device 128 is illustrated as being spatially separated from the in-vehicle computing system and connected via a substantially external communication link (e.g., a cable or radiofrequency signal), it is to be understood that a slot 132 or other storage structure may be formed in the instrument panel 106 or other location in the vehicle to hold the mobile device in a particular location. The storage structure may include an integrated connector 134 to which the mobile device 128 may be attached or "docked" for providing a substantially internal communication link between the mobile device and the computing system.

In-vehicle computing system 109 may also be communicatively coupled to additional devices operated by the user but located external to vehicle 102, such as one or more external devices 150. In the depicted embodiment, external devices 150 are located outside of vehicle 102 though it will be appreciated that in alternate embodiments, external devices may be located inside cabin 100. The external devices may include a server computing system, personal computing system, portable electronic device, electronic wrist band, electronic head band, portable music player, electronic activity tracking device, pedometer, smart-watch, GPS system, etc. External devices 150 may be connected to the in-vehicle computing system via communication link 136 which may be wired or wireless, as discussed with reference to communication link 130, and configured to provide two-way communication between the external devices and the in-vehicle computing system. For example, external devices 150 may include one or more sensors and communication link 136 may transmit sensor output from external devices 150 to in-vehicle computing system 109 and touch screen 108. External devices 150 may also store and/or receive information regarding contextual data, user behavior/preferences, operating rules, etc. and may transmit such information from the external devices 150 to in-vehicle computing system 109 and touch screen 108.

In-vehicle computing system 109 may analyze the input received from external devices 150, mobile device 128, and/or other input sources and select settings for various in-vehicle systems (such as climate control system or audio system), provide output via touch screen 108 and/or speakers 112, communicate with mobile device 128 and/or external devices 150, and/or perform other actions based on the assessment. In some embodiments, all or a portion of the assessment may be performed by the mobile device 128 and/or the external devices 150.

In some embodiments, one or more of the external devices 150 may be communicatively coupled to in-vehicle computing system 109 indirectly, via mobile device 128 and/or another of the external devices 150. For example, communication link 136 may communicatively couple external devices 150 to mobile device 128 such that output from external devices 150 is relayed to mobile device 128. Data received from external devices 150 may then be aggregated at mobile device 128 with data collected by mobile device 128, the aggregated data then transmitted to in-vehicle computing system 109 and touch screen 108 via communication link 130. Similar data aggregation may occur at a server system and then transmitted to in-vehicle computing system 109 and touch screen 108 via communication link 136/130.

Figure 2:
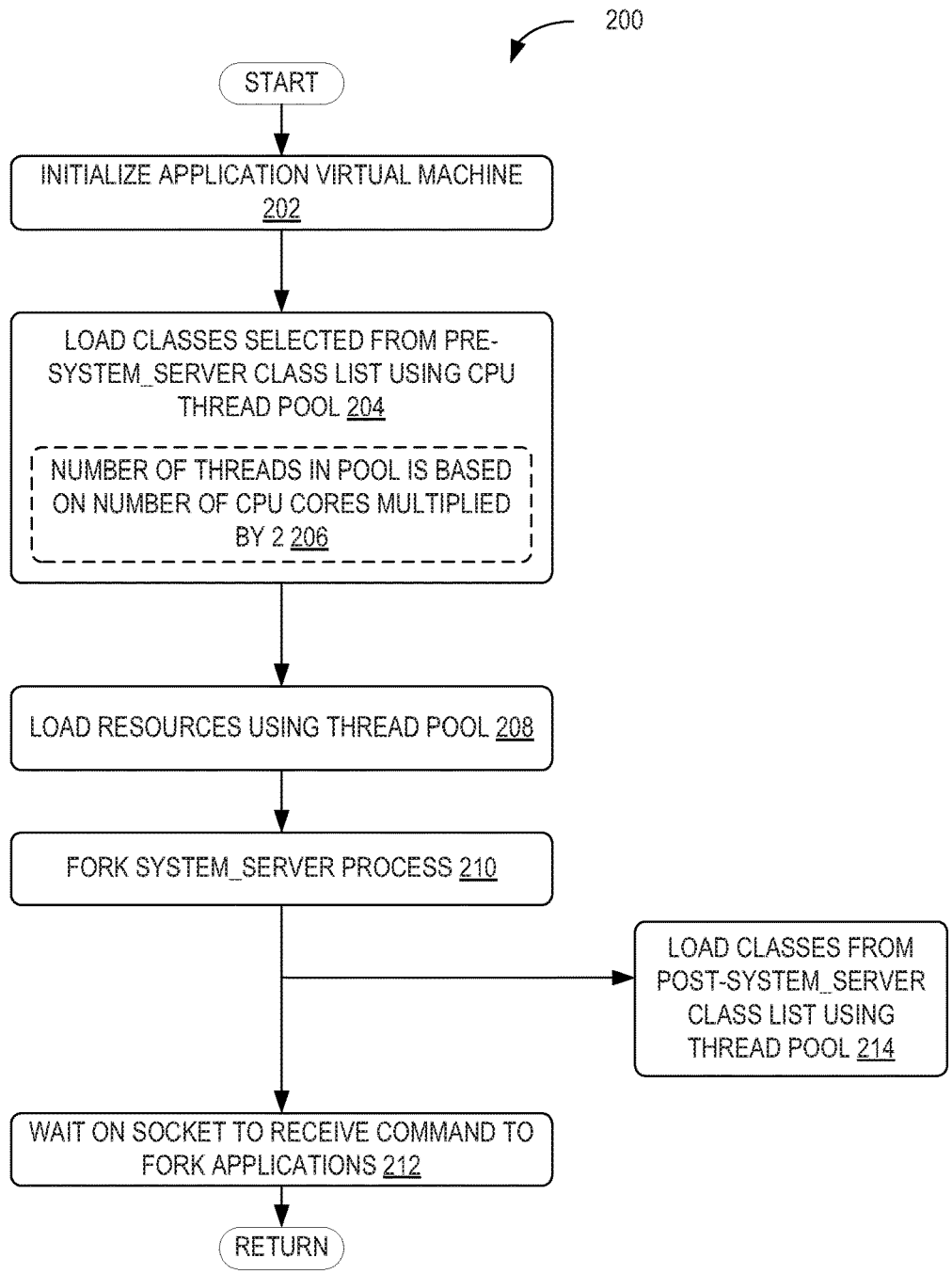
FIG. 2 is a flow chart for an example method of accelerating an initialization of an application virtual machine on a computing device in accordance with one or more embodiments of the present disclosure.

FIG. 2 is a flow chart for a method 200 of accelerating an initialization of an application virtual machine on a computing device, such as in-vehicle computing device 109 of FIG. 1. For example, method 200 may be utilized as a part of the Zygote process for ANDROID operating system initialization. At 202, method 200 includes initializing the application virtual machine (e.g., DALVIK for ANDROID operating systems). For example, such initialization may be triggered by powering on the computing device or otherwise instructing the computing device to begin operation. At 204, the method includes loading classes selected from a pre-system_server class list using a CPU thread pool. As indicated at 206, the number of threads in the CPU thread pool is based on the number of CPU cores multiplied by two. Each thread may be used to load a class, load a resource, and/or perform any other suitable task.

In some systems, a system_server process may be loaded after preloading all classes and resources in order to begin loading other services for operating the computing device. The system_server process may be a service-loading process that is configured to initialize services used during the initialization of the operating system and register the services with a Service Manager. The system_server process may also start an Activity Manager to manage other activities of the operating system. By loading only classes in a pre-system_server class list instead of all of the classes, the system may decrease the amount of time dedicated to preloading classes by reducing the number of classes that are preloaded. The pre-system_server class list may be generated based on the load time of each class, the number of processes that use each class, and/or any other parameter indicating a priority of each class. For example, classes within the pre-system_server class list may have a load time that is smaller than a threshold load time (e.g., 1250 μs in one non-limiting example) and may be used by more than a threshold number of processes (e.g., 10 processes in one non-limiting example). The pre-system_server class list may include a system_server process to enable loading of system_server. In some examples, system_server may be a last process that is loaded, after all other classes in the pre-system_server class list are loaded. An example list of pre-system_server classes for an ANDROID operating system is provided below in Appendix I. The example list may not be exhaustive and additional or alternative classes may be included or removed from the list based on factors such as the operating system/software on the computing device, the computing device/hardware, usage/environment of the computing device, etc. It is to be understood that any suitable threshold load time and threshold number of processes may be utilized to generate the pre-system_server class list without departing from the scope of this disclosure.

At 208, method 200 includes loading resources using the thread pool. Resources may include additional files and content that applications or other software utilize, such as layout definitions, animation instructions, bitmaps, user interface strings, etc. In some examples, all resources to be loaded during initialization may be loaded at 208. In other examples, resources may be loaded in stages similarly to the classes as described above (e.g., a subset of the resources loaded at a pre-system_server stage and a subset of the resources loaded at a post-system_server stage). At 210, the method proceeds to fork the system_server process in order to load system_server. Forking may include copying an existing process and overlaying a new process that is to be loaded over the copy of the existing process. The system_server process may be used to fork other applications as requested. Accordingly, method 200 proceeds to 212 to wait on an inter-process communication socket to receive a command to fork applications (e.g., based on a request to launch the applications). Upon receiving such a command to fork applications, the system_server process may create copies of itself and overlay the requested application on the copies to load the requested applications.

As indicated at 214, classes from a post-system_server class list may be loaded after forking the system_server process. The post-system_server class list may be generated based on the load time threshold and/or processes threshold described above with respect to the pre-system_server class list. For example, the post-system_server class list may include classes that are to be loaded as part of the initialization procedure but have a load time over the load time threshold described above (e.g., 1250 µs in one non-limiting example) and are utilized by more than the threshold number of processes (e.g., 10 processes in one non-limiting example). An example list of post-system_server classes for an ANDROID operating system is provided below in Appendix II. The example list may not be exhaustive and additional or alternative classes may be included or removed from the list based on factors such as the operating system/software on the computing device, the computing device/hardware, usage/environment of the computing device, etc. It is to be understood that any suitable threshold load time and threshold number of processes may be utilized to generate the post-system_server class list without departing from the scope of this disclosure. In some examples, additional loading stages may be utilized. For example, the pre-system_server class list and/or the post-system_server class list may be split into additional lists for loading at different stages during the initialization routine.

Figure 3:
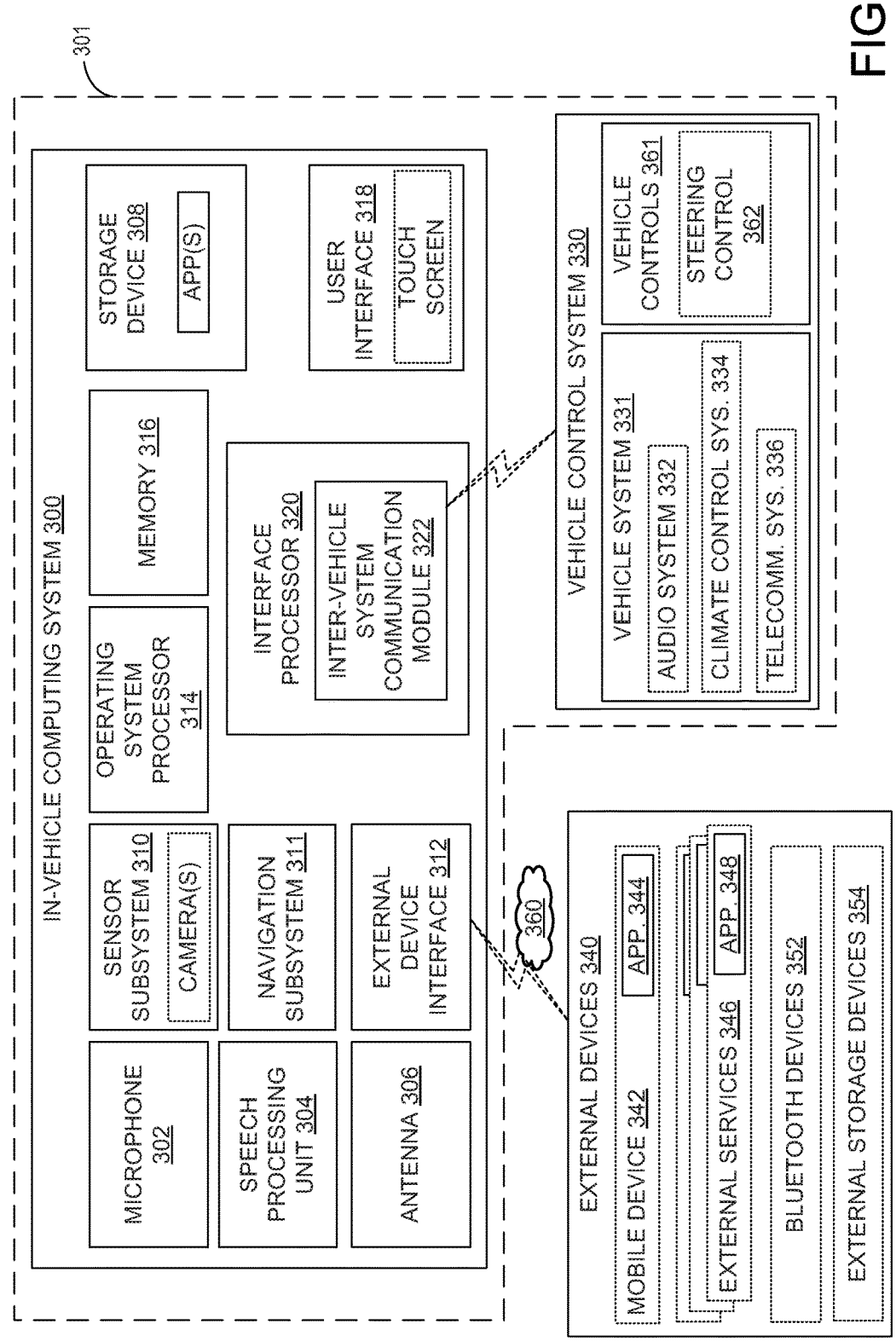
FIG. 3 shows a block diagram of an example in-vehicle computing system in accordance with one or more embodiments of the present disclosure.

FIG. 3 shows a block diagram of an in-vehicle computing system 300 configured and/or integrated inside vehicle 301. In-vehicle computing system 300 may be an example of in-vehicle computing system 109 of FIG. 1 and/or may perform one or more of the methods described herein, such as method 200 of FIG. 2 in some embodiments. In some examples, the in-vehicle computing system may be a vehicle infotainment system configured to provide information-based media content (audio and/or visual media content, including entertainment content, navigational services, etc.) to a vehicle user to enhance the operator's in-vehicle experience. The vehicle infotainment system may include, or be coupled to, various vehicle systems, sub-systems, hardware components, as well as software applications and systems that are integrated in, or integratable into, vehicle 301 in order to enhance an in-vehicle experience for a driver and/or a passenger.

In-vehicle computing system 300 may include one or more processors including an operating system processor 314 and an interface processor 320. Operating system processor 314 may execute an operating system on the in-vehicle computing system, and control input/output, display, playback, and other operations of the in-vehicle computing system. Interface processor 320 may interface with a vehicle control system 330 via an inter-vehicle system communication module 322.

Inter-vehicle system communication module 322 may output data to other vehicle systems 331 and vehicle control elements 361, while also receiving data input from other vehicle components and systems 331, 361, e.g. by way of vehicle control system 330. When outputting data, inter-vehicle system communication module 322 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), digital signals propagated through vehicle data networks (such as an engine controller area network [CAN] bus through which engine related information may be communicated, a climate control CAN bus through which climate control related information may be communicated, and a multimedia data network through which multimedia data is communicated between multimedia components in the vehicle). For example, the in-vehicle computing system may retrieve from the engine CAN bus the current speed of the vehicle estimated by the wheel sensors, a power state of the vehicle via a battery and/or power distribution system of the vehicle, an ignition state of the vehicle, etc. In addition, other interfacing means such as Ethernet may be used as well without departing from the scope of this disclosure.

A non-volatile storage device 308 may be included in in-vehicle computing system 300 to store data such as instructions executable by processors 314 and 320 in non-volatile form. The storage device 308 may store application data to enable the in-vehicle computing system 300 to run an application for connecting to a cloud-based server and/or collecting information for transmission to the cloud-based server. The application may retrieve information gathered by vehicle systems/sensors, input devices (e.g., user interface 318), devices in communication with the in-vehicle computing system (e.g., a mobile device connected via a Bluetooth link), etc. In-vehicle computing system 300 may further include a volatile memory 316. Volatile memory 316 may be random access memory (RAM). Non-transitory storage devices, such as non-volatile storage device 308 and/or volatile memory 316, may store instructions and/or code that, when executed by a processor (e.g., operating system processor 314 and/or interface processor 320), controls the in-vehicle computing system 300 to perform one or more of the actions described in the disclosure.

A microphone 302 may be included in the in-vehicle computing system 300 to receive voice commands from a user, to measure ambient noise in the vehicle, to determine whether audio from speakers of the vehicle is tuned in accordance with an acoustic environment of the vehicle, etc. A speech processing unit 304 may process voice commands, such as the voice commands received from the microphone 302. In some embodiments, in-vehicle computing system 300 may also be able to receive voice commands and sample ambient vehicle noise using a microphone included in an audio system 332 of the vehicle.

One or more additional sensors may be included in a sensor subsystem 310 of the in-vehicle computing system 300. For example, the sensor subsystem 310 may include a camera, such as a rear view camera for assisting a user in parking the vehicle and/or a cabin camera for identifying a user (e.g., using facial recognition and/or user gestures). Sensor subsystem 310 of in-vehicle computing system 300 may communicate with and receive inputs from various vehicle sensors and may further receive user inputs. For example, the inputs received by sensor subsystem 310 may include transmission gear position, transmission clutch position, gas pedal input, brake input, transmission selector position, vehicle speed, engine speed, mass airflow through the engine, ambient temperature, intake air temperature, etc., as well as inputs from climate control system sensors (such as heat transfer fluid temperature, antifreeze temperature, fan speed, passenger compartment temperature, desired passenger compartment temperature, ambient humidity, etc.), an audio sensor detecting voice commands issued by a user, a fob sensor receiving commands from and optionally tracking the geographic location/proximity of a fob of the vehicle, etc. While certain vehicle system sensors may communicate with sensor subsystem 310 alone, other sensors may communicate with both sensor subsystem 310 and vehicle control system 330, or may communicate with sensor subsystem 310 indirectly via vehicle control system 330. A navigation subsystem 311 of in-vehicle computing system 300 may generate and/or receive navigation information such as location information (e.g., via a GPS sensor and/or other sensors from sensor subsystem 310), route guidance, traffic information, point-of-interest (POI) identification, and/or provide other navigational services for the driver.

External device interface 312 of in-vehicle computing system 300 may be coupleable to and/or communicate with one or more external devices 340 located external to vehicle 301. While the external devices are illustrated as being located external to vehicle 301, it is to be understood that they may be temporarily housed in vehicle 301, such as when the user is operating the external devices while operating vehicle 301. In other words, the external devices 340 are not integral to vehicle 301. The external devices 340 may include a mobile device 342 (e.g., connected via a Bluetooth connection) or an alternate Bluetooth-enabled device 352. Mobile device 342 may be a mobile phone, smart phone, wearable devices/sensors that may communicate with the in-vehicle computing system via wired and/or wireless communication, or other portable electronic device(s). Other external devices include external services 346. For example, the external devices may include extra-vehicular devices that are separate from and located externally to the vehicle. Still other external devices include external storage devices 354, such as solid-state drives, pen drives, USB drives, etc. External devices 340 may communicate with in-vehicle computing system 300 either wirelessly or via connectors without departing from the scope of this disclosure. For example, external devices 340 may communicate with in-vehicle computing system 300 through the external device interface 312 over network 360, a universal serial bus (USB) connection, a direct wired connection, a direct wireless connection, and/or other communication link. The external device interface 312 may provide a communication interface to enable the in-vehicle computing system to communicate with mobile devices associated with contacts of the driver. For example, the external device interface 312 may enable phone calls to be established and/or text messages (e.g., SMS, MMS, etc.) to be sent (e.g., via a cellular communications network) to a mobile device associated with a contact of the driver (e.g., via SMS service 202, phone service 204, and/or email service 206 of FIG. 2).

One or more applications 344 may be operable on mobile device 342. As an example, mobile device application 344 may be operated to aggregate user data regarding interactions of the user with the mobile device. For example, mobile device application 344 may aggregate data regarding music playlists listened to by the user on the mobile device, telephone call logs (including a frequency and duration of telephone calls accepted by the user), positional information including locations frequented by the user and an amount of time spent at each location, etc. The collected data may be transferred by application 344 to external device interface 312 over network 360. In addition, specific user data requests may be received at mobile device 342 from in-vehicle computing system 300 via the external device interface 312. The specific data requests may include requests for determining where the user is geographically located, an ambient noise level and/or music genre at the user's location, an ambient weather condition (temperature, humidity, etc.) at the user's location, etc. Mobile device application 344 may send control instructions to components (e.g., microphone, etc.) or other applications (e.g., navigational applications) of mobile device 342 to enable the requested data to be collected on the mobile device. Mobile device application 344 may then relay the collected information back to in-vehicle computing system 300.

Likewise, one or more applications 348 may be operable on external services 346. As an example, external services applications 348 may be operated to aggregate and/or analyze data from multiple data sources. For example, external services applications 348 may aggregate data from one or more social media accounts of the user, data from the in-vehicle computing system (e.g., sensor data, log files, user input, etc.), data from an internet query (e.g., weather data, POI data), etc. The collected data may be transmitted to another device and/or analyzed by the application to determine a context of the driver, vehicle, and environment and perform an action based on the context (e.g., requesting/sending data to other devices).

Vehicle control system 330 may include controls for controlling aspects of various vehicle systems 331 involved in different in-vehicle functions. These may include, for example, controlling aspects of vehicle audio system 332 for providing audio entertainment to the vehicle occupants, aspects of climate control system 334 for meeting the cabin cooling or heating needs of the vehicle occupants, as well as aspects of telecommunication system 336 for enabling vehicle occupants to establish telecommunication linkage with others.

Audio system 332 may include one or more acoustic reproduction devices including electromagnetic transducers such as speakers. Vehicle audio system 332 may be passive or active such as by including a power amplifier. In some examples, in-vehicle computing system 300 may be the only audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

Climate control system 334 may be configured to provide a comfortable environment within the cabin or passenger compartment of vehicle 301. Climate control system 334 includes components enabling controlled ventilation such as air vents, a heater, an air conditioner, an integrated heater and air-conditioner system, etc. Other components linked to the heating and air-conditioning setup may include a windshield defrosting and defogging system capable of clearing the windshield and a ventilation-air filter for cleaning outside air that enters the passenger compartment through a fresh-air inlet.

Vehicle control system 330 may also include controls for adjusting the settings of various vehicle controls 361 (or vehicle system control elements) related to the engine and/or auxiliary elements within a cabin of the vehicle, such as steering wheel controls 362 (e.g., steering wheel-mounted audio system controls, cruise controls, windshield wiper controls, headlight controls, turn signal controls, etc.), instrument panel controls, microphone(s), accelerator/brake/clutch pedals, a gear shift, door/window controls positioned in a driver or passenger door, seat controls, cabin light controls, audio system controls, cabin temperature controls, etc. The control signals may also control audio output at one or more speakers of the vehicle's audio system 332. For example, the control signals may adjust audio output characteristics such as volume, equalization, audio image (e.g., the configuration of the audio signals to produce audio output that appears to a user to originate from one or more defined locations), audio distribution among a plurality of speakers, etc. Likewise, the control signals may control vents, air conditioner, and/or heater of climate control system 334. For example, the control signals may increase delivery of cooled air to a specific section of the cabin.

Control elements positioned on an outside of a vehicle (e.g., controls for a security system) may also be connected to computing system 300, such as via communication module 322. The control elements of the vehicle control system may be physically and permanently positioned on and/or in the vehicle for receiving user input. In addition to receiving control instructions from in-vehicle computing system 300, vehicle control system 330 may also receive input from one or more external devices 340 operated by the user, such as from mobile device 342. This allows aspects of vehicle systems 331 and vehicle controls 361 to be controlled based on user input received from the external devices 340.

In-vehicle computing system 300 may further include an antenna 306. Antenna 306 is shown as a single antenna, but may comprise one or more antennas in some embodiments. The in-vehicle computing system may obtain broadband wireless internet access via antenna 306, and may further receive broadcast signals such as radio, television, weather, traffic, and the like. The in-vehicle computing system may receive positioning signals such as GPS signals via one or more antennas 306. The in-vehicle computing system may also receive wireless commands via RF such as via antenna(s) 306 or via infrared or other means through appropriate receiving devices. In some embodiments, antenna 306 may be included as part of audio system 332 or telecommunication system 336. Additionally, antenna 306 may provide AM/FM radio signals to external devices 340 (such as to mobile device 342) via external device interface 312.

One or more elements of the in-vehicle computing system 300 may be controlled by a user via user interface 318. User interface 318 may include a graphical user interface presented on a touch screen, such as touch screen 108 of FIG. 1, and/or user-actuated buttons, switches, knobs, dials, sliders, etc. For example, user-actuated elements may include steering wheel controls, door and/or window controls, instrument panel controls, audio system settings, climate control system settings, and the like. A user may also interact with one or more applications of the in-vehicle computing system 300 and mobile device 342 via user interface 318. In addition to receiving a user's vehicle setting preferences on user interface 318, vehicle settings selected by in-vehicle control system may be displayed to a user on user interface 318. Notifications and other messages (e.g., received messages), as well as navigational assistance, may be displayed to the user on a display of the user interface. User preferences/information and/or responses to presented messages may be performed via user input to the user interface.

Figure 4:
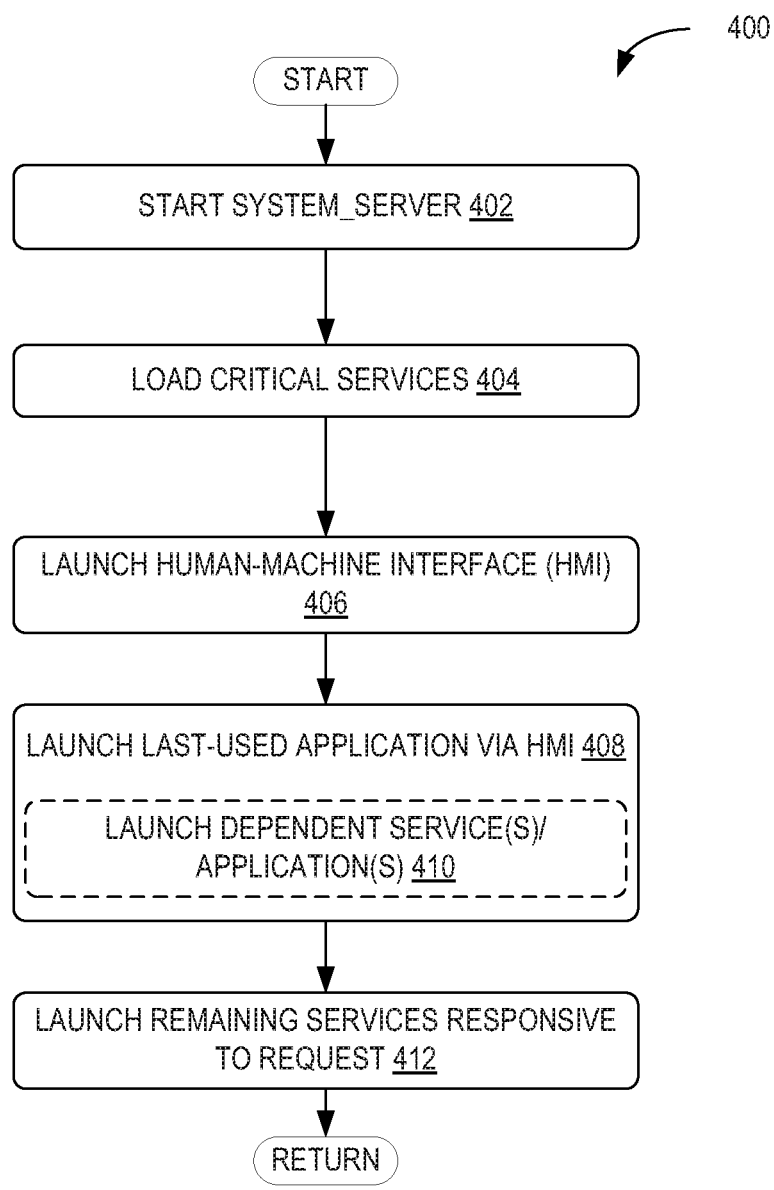
FIG. 4 is a flow chart of an example method for selectively loading services in an operating system in accordance with one or more embodiments of the present disclosure.

FIG. 4 is a flow chart of a method 400 for selectively loading services in an operating system. Method 400 may be performed by a computing device, such as in-vehicle computing device 109 of FIG. 1. At 402, the method includes starting the system_server. For example, method 400 may be performed during and/or after 210 of method 200 of FIG. 2 to initialize and operate an operating system and/or other software of a computing device. The system_server may be utilized to load critical services (e.g., services that are critical to the functioning of the system, without which the system may not function or may function poorly), as indicated at 404. For example, services such as Package Manager, Window Manager, Input Manager, and Mount service are examples of services that may be critical to the functioning of an ANDROID operating system. Loading critical services as indicated at 404 may include loading only the critical services, and not loading any other services (e.g., not loading non-critical services, without which the system is still able to function). Examples of non-critical services (which may be loaded at a later time and/or may only be loaded responsive to a request for use of the service) may include UISpeechService (for speech recognition), BLUETOOTH Manager, Tuner Service (for adjusting vehicle radio controls), etc.

At 406, the method includes launching a human-machine interface (HMI). For example, a human-machine interface may include a user interface (UI) and/or a graphical user interface (GUI) that enables a user to interact with the computing device and/or the operating system being initialized. The HMI may be utilized to launch applications, including a last-used application, as indicated at 408. For example, the computing device may be an in-vehicle computing device, and a last-used application may be the last application (e.g., a navigation application) that was active prior to the vehicle and/or the in-vehicle computing system being shut off. As indicated at 410, launching the last-used application may include launching and/or initializing any dependent service(s), application(s), resource(s), class(es), etc. For example, the navigation application may utilize dependent services such as a GPS service for locating the vehicle. Accordingly, the navigation may request that the GPS service is launched at 410 to ensure proper operation of the navigation application when launched. In some embodiments, the last-used application may be launched after all dependent service(s), etc. are launched. In other embodiments, the last-used application may be launched alongside the dependent service(s), etc. (e.g., in parallel with the dependent services). At 412, the method includes launching remaining services responsive to request. In this way, services and associated dependent services/applications may be launched dynamically when requested to allow for an efficient, request-driven initialization process.

Figure 5:
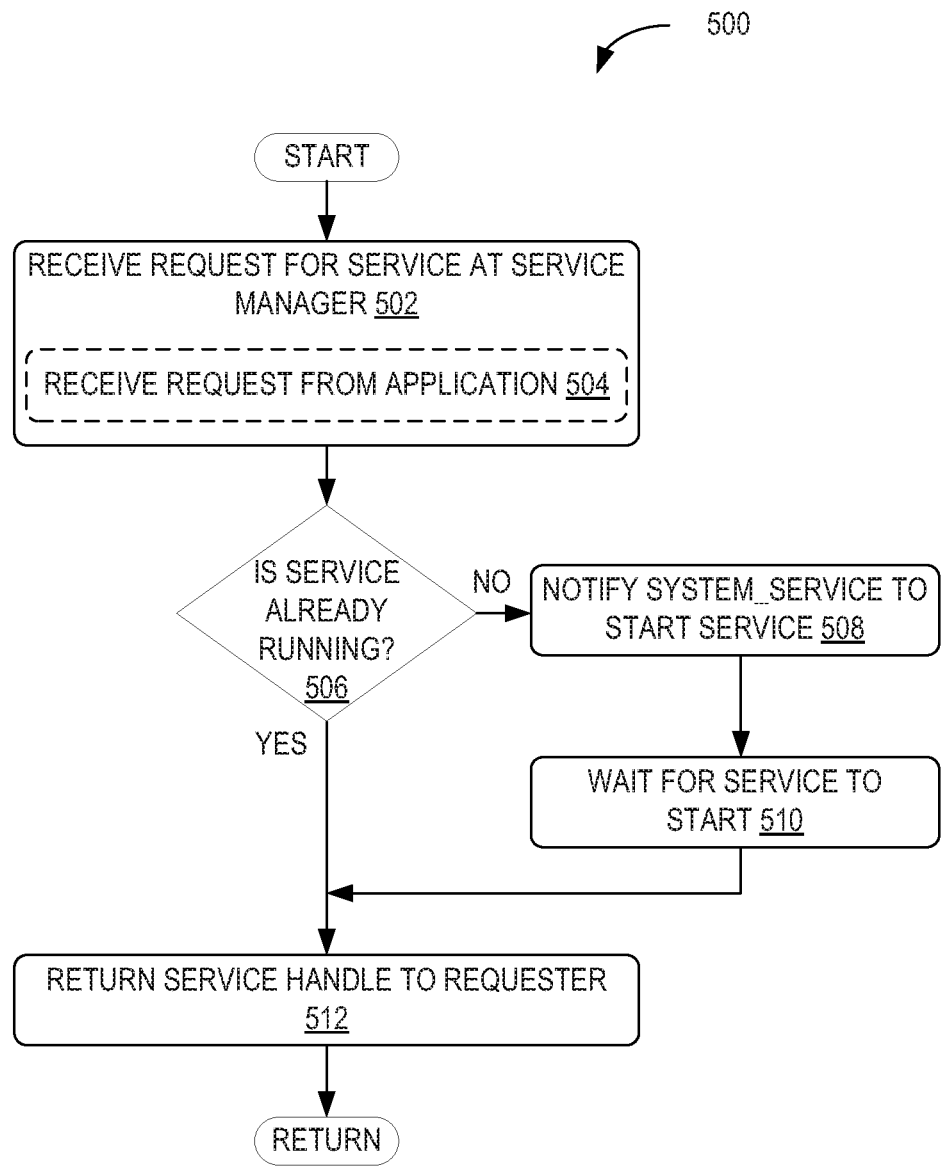
FIG. 5 is a flow chart of an example method for managing services of an operating system in a computing device in accordance with one or more embodiments of the present disclosure.

FIG. 5 is a flow chart for a method 500 of managing services of an operating system in a computing device. For example, method 500 may be performed by in-vehicle computing system 109 of FIG. 1 to handle service requests issued by applications that are attempting to be loaded at the in-vehicle computing system. At 502, the method includes receiving a request for a service at a service manager of the computing device. The request may be received from an application that utilizes the service, as indicated at 504. For example, method 500 may be performed in order to launch dependent services for an application that is attempting to be launched, as described with reference to 410 of method 400 in FIG. 4. At 506, method 500 includes determining if the requested service is already running on the computing device. If the service is not already running (e.g., "NO" at 506), the method proceeds to 508 to notify the system_service process to start the requested service and to 510 to wait for the service to start. Upon starting the service (or if the service was already running, "YES" at 506), the method proceeds to 512 to return the service handle to the requester of the service (e.g., the application that requested the service). The service handle may serve as a confirmation that the service is/was started and/or may be utilized by the application to call up the service.

Figure 6:
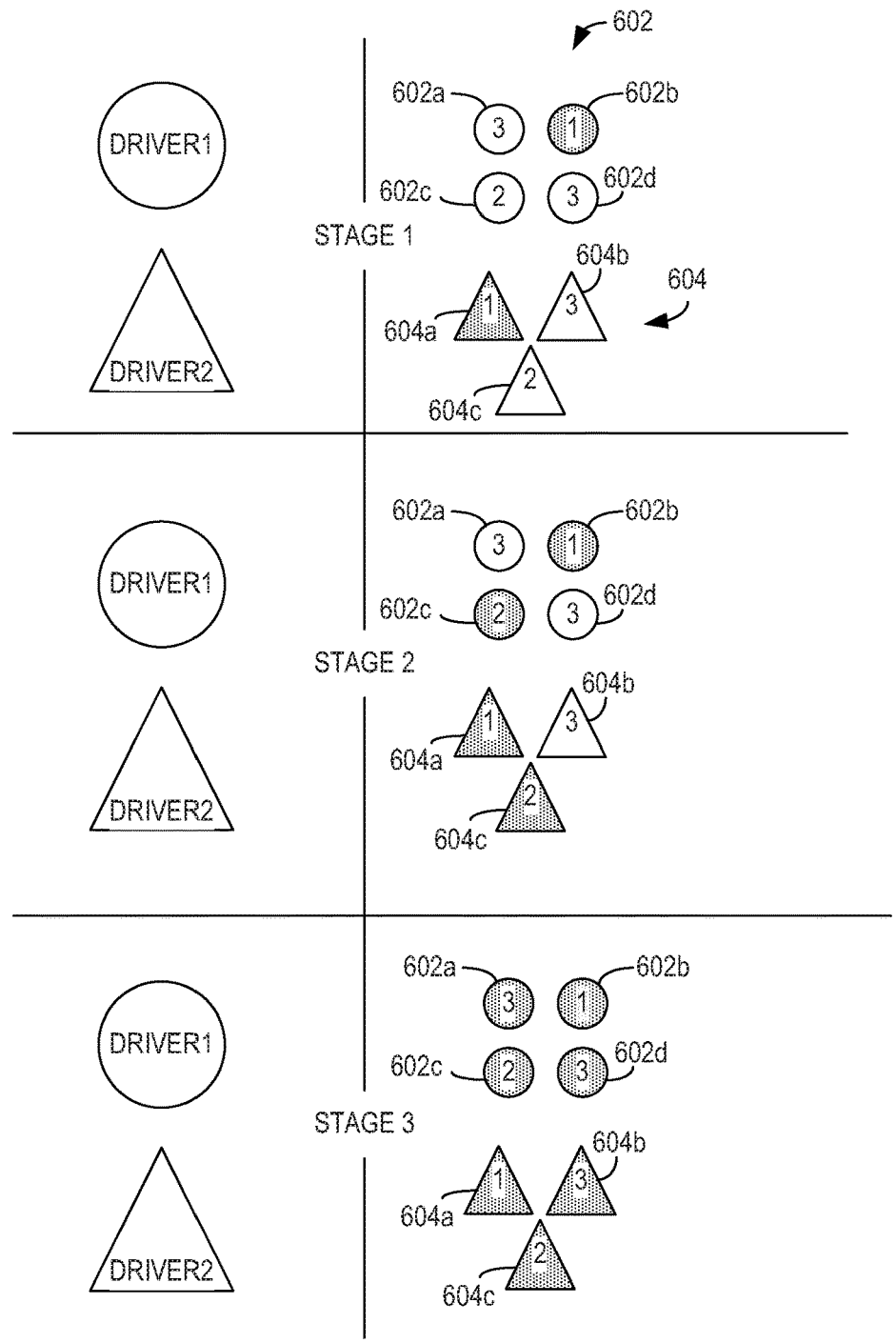
FIG. 6 shows example drivers and associated hardware instances that may be loaded at different stages in accordance with one or more embodiments of the present disclosure.

FIG. 6 is a block diagram showing relationships between drivers and associated hardware instances that may be loaded at different stages. Similarly to the classes that may be loaded in different stages (e.g., a pre-system_server stage and a post-system_server stage) as described above with respect to FIG. 2, computing device/operating system initialization may be accelerated by loading drivers and associated hardware instances in stages based on usage characteristics. For example, a first driver, Driver1, may support a first group of hardware instances 602 and a second driver, Driver2, may support a second group of hardware instances 604. Each hardware instance may be designated as being used in a particular stage of initialization, illustrated by a number inside each of the hardware instances 602*a-d* and 604*a-c*. For example, hardware instance 602*b* (supported by Driver1) and hardware instance 604*a* (supported by Driver2) may be associated with stage 1 based on the priority of these hardware instances. Stage 1 hardware instances may be the most critical hardware instances for the system. In other words, stage 1 hardware instances may affect the operation of the system and/or be utilized by applications or other processes that are started during or shortly after operating system initialization. For example, the stage 1 hardware instances may be utilized for loading critical services and/or utilized by the critical services referenced at 404 in method 400 of FIG. 4.

As illustrated in FIG. 6, for each stage, the shaded hardware instances represent the hardware instances that are initialized during that stage and/or are already initialized upon entering that stage. For example, in stage 1, all hardware instances designated as stage 1 are initialized (e.g., hardware instances 602*b* and 604*a*). In stage 2 the hardware instances designated as stage 1 are already initialized, and the hardware instances designated as stage 2 (e.g., hardware instances 602*c* and 604*c*) are newly initialized. In stage 3, all hardware instances are either already initialized (stage 1 and stage 2 instances) or newly initialized (e.g., stage 3 hardware instances 602*a*, 602*d*, and 604*b*). Some operating systems may utilize a device tree to tell an associated kernel which hardware components are available in the system. An indication of the stage of initialization for each hardware instance may be added as a new entry of the device tree to enable the kernel to selectively load hardware instances according to stages.

Figure 7:
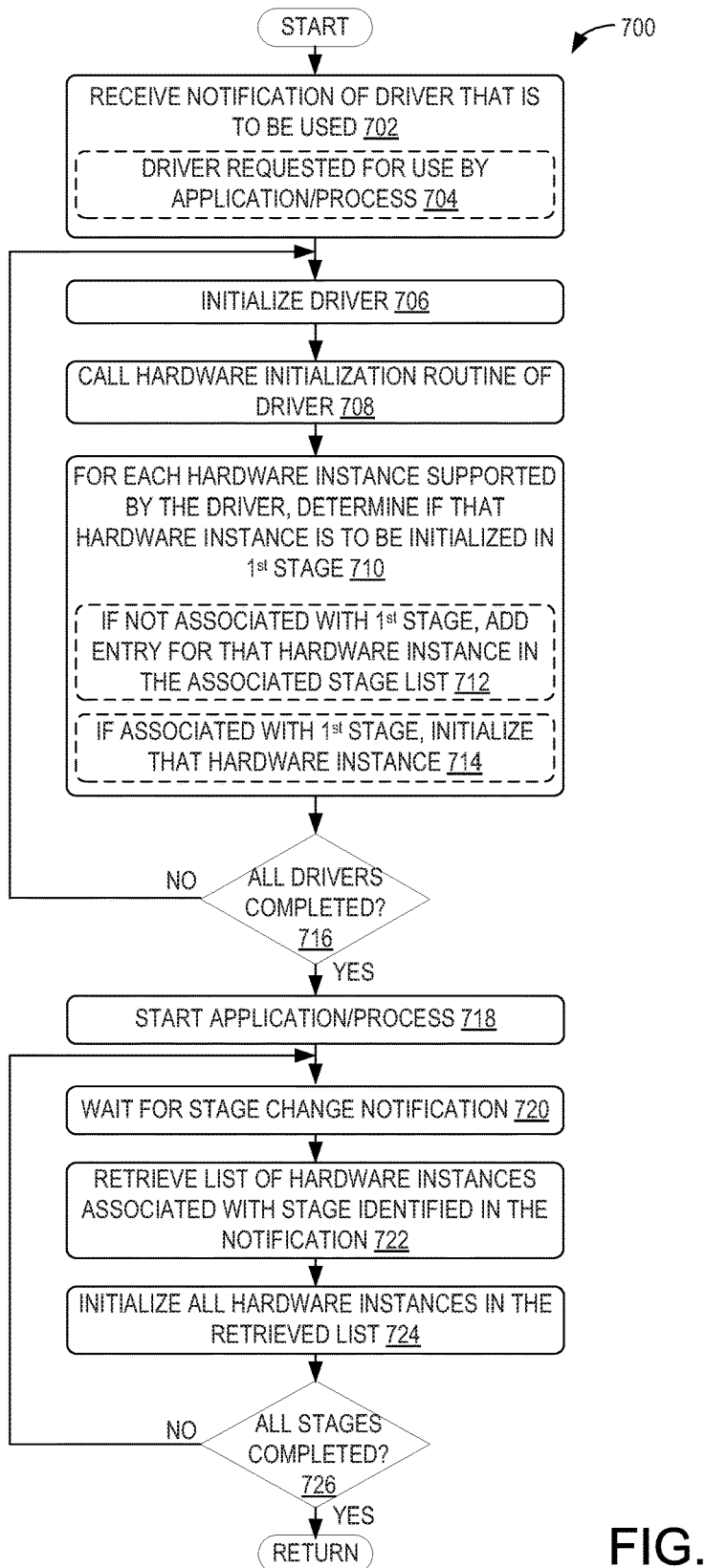
FIG. 7 is a flow chart of an example method for selectively initializing hardware instances for initialized drivers in accordance with one or more embodiments of the present disclosure.

FIG. 7 is a flow chart for a method 700 of selectively initializing hardware instances for initialized drivers. Method 700 may be performed by an in-vehicle computing system, such as in-vehicle computing system 109 of FIG. 1 to enable increased start up speeds for the device. At 702, method 700 includes receiving a notification identifying a driver that is to be used by the operating system. The use of the driver may be requested by an application and/or process, as indicated at 704. For example, the system_server process and/or other initialization applications/processes may request the use of a driver supporting flash memory hardware during startup. At 706, the method includes initializing the driver identified in the notification of 702. Continuing the example described above, the flash memory may be controlled by one of a plurality of memory management circuit controllers (MMC controllers) in the computing device. As all MMC controllers are supported by a single driver, that driver may be requested and subsequently initialized responsive to a request to use the flash memory.

At 708, the method includes calling a hardware initialization routine of the driver. The hardware initialization routine includes, for each hardware instance supported by the driver, determining if that hardware instance is to be initialized in the first stage, as indicated at 710. For example, as described above with respect to FIG. 6, each hardware instance may be associated with a particular stage, indicating a relative time at which the hardware instance will be used by the system (and thus will be initialized). If a given hardware instance is not associated with a first stage, then the method includes adding an entry for that hardware instance in the associated stage list (e.g., if the hardware instance is associated with a second stage, adding an entry for the hardware instance in a second stage list, etc.), as indicated at 712. Conversely, if a given hardware instance is associated with the first stage, the method includes initializing that hardware instance, as indicated at 714. In this way, each hardware instance supported by the driver may be evaluated, and only the hardware instances that will be utilized in the first stage are loaded in order to reduce initialization loading times.

Continuing the example described above, as all MMC controllers are supported by the same driver, initializing the driver supporting the MMC controller for flash memory may cause each MMC controller (and associated hardware) to be evaluated. For example, another MMC controller may control networking hardware, such as a WiFi chip, which may be associated with a third stage (e.g., the WiFi chip may not be needed/requested until much later in the initialization process than the flash memory or after the initialization process has already completed). Accordingly, when loading the MMC controller driver, the MMC controller for the flash memory (associated with the first stage) may be initialized, while the MMC controller for the WiFi card (associated with the third stage) may be added to a third stage list to be initialized upon reaching the third stage. In this way, only the requested hardware instances may be loaded, even if a driver that supports multiple hardware instances is loaded, thereby reducing initialization load times.

At 716, the method includes determining if all drivers have been completed. For example, the processes described at 706-714 may be repeated for all drivers that are requested for use. In some embodiments, all drivers of the system may be evaluated via steps 706-714. In either example, if all drivers (that are requested for use and/or all drivers of the system) have not been completed (e.g., "NO" at 716), the method returns to 706 to initialize a next driver and proceed through the hardware initialization routine for that next driver. If all drivers (that are requested for use and/or all drivers of the system) have been completed (e.g., "YES" at 716), the method proceeds to 718 to start the application/ process (e.g., the application/process that requested use of the driver/hardware instance at 702/704). Prior steps of method 700 may have been completed via a kernel of the operating system during a first initialization stage. After starting the application, the system may manage/monitor the state of the vehicle, the computing device, and/or user input and inform the kernel of stage transitions. At 720, the method includes waiting for a stage change notification (e.g., changing from a first stage of initialization to a second stage). For example, a stage change notification may be provided responsive to completing all loading and other tasks for a current stage or responsive to a new application load request. Responsive to the stage change, the method includes retrieving a list of hardware instances associated with the stage identified in the notification, as indicated at 722. For example, adding each hardware instance that is not immediately initialized in the first stage to an associated stage list at 712 enables the generation and updating of a list of hardware instances for each stage, which may be referenced at 722. All hardware instances in the retrieved list are initialized at 724.

Responsive to initializing each hardware instance for a given stage, the method proceeds to 726 to evaluate whether all stages have been completed. For example, the system may determine whether additional hardware instances that have not been initialized are present in further stage lists. If all stages have not been completed (e.g., "NO" at 726), the method returns to 720 to wait for the stage to change to the next stage. If all stages have been completed (e.g., "YES" at 726), the method ends or returns to wait for further initialization requests.

In addition to the example described above regarding MMC controllers and associated hardware elements (e.g., flash memory and WiFi chips), other driver/hardware element combinations may be evaluated and initialized as a part of method 700. As additional, non-limiting examples, the computing device may include three instances of Inter-integrated circuit controllers (I2C controllers), each connected to one of a touch screen sensor, radio tuning controls, and a power management chip. The computing device may include four instances of a serial bus interface (e.g., a universal asynchronous receiver/transmitter—UART), which may be used to connect to a BLUETOOTH chip, vehicle interface processing chip, etc. Instances of such controllers may be enabled based on the stage of booting similarly to the MMC controller example described above. In other examples, hardware elements (e.g., USB interface/chips, displays, etc.) may exist as a single instance associated with a single driver, which may be loaded at the associated stage. For example, a display may be associated with a display driver, which only supports one hardware instance (the display). Accordingly, if the display is associated with stage 2 (for example), the display driver may not be loaded/initialized until stage 2. Upon initializing the driver, since only one hardware instance is supported by the driver, the hardware instance may be initialized responsive to initializing the driver.

Figure 8:
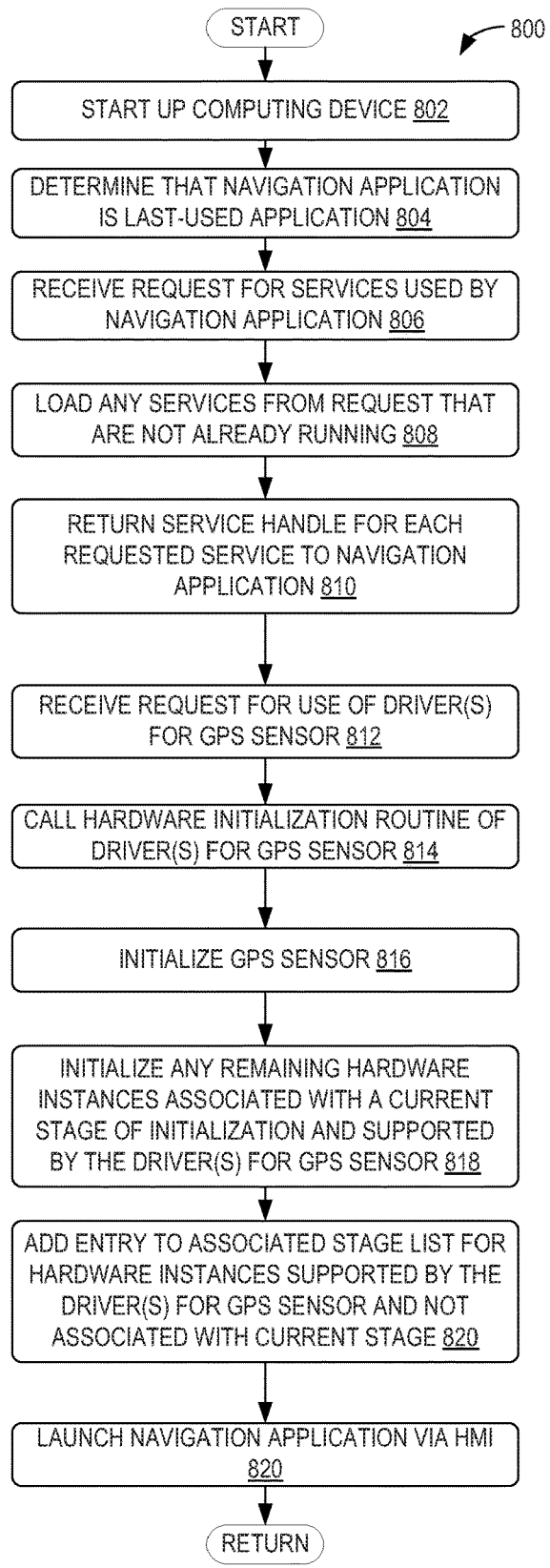
FIG. 8 is a flow chart of an example method for loading an application on a computing device in accordance with one or more embodiments of the present disclosure.

FIG. 8 is a flow chart of a method 800 for loading a last-used application on a computing device. For example, method 800 may be performed by an in-vehicle computing device, such as in-vehicle computing device 109 of FIG. 1. At 802, method 800 includes starting up a computing device. At 804, the method includes determining that a navigation application was the last-used application on the computing device. For example, the navigation application may have been the last application to be running at a last shut down event of the computing device and/or may be a last application to receive user input and/or perform an action prior to a shut down event of the computing device. At 806, the method includes receiving a request for services used by the navigation application. Any services from the request that are not already running on the computing device may be loaded, as indicated at 808. A service handle for each requested service is returned to the navigation application at 810. At 812, the method includes receiving a request for the use of driver(s) for a GPS sensor. For example, the navigation application may utilize the GPS sensor to operate, thus the application may request the driver for the GPS sensor to be loaded to allow access to this element.

At 814, the method includes calling the hardware initialization routine associated with any drivers supporting the GPS sensor. The GPS sensor is initialized at 816, and any remaining hardware instances associated with a current (or prior) stage of initialization and supported by the driver are loaded at 818. For example, if the initialization routine is at stage 1, and the driver supporting the GPS sensor also supports other hardware instances associated with (e.g., designated as being initialized/used during) stage 1, such hardware instances are loaded at 818. At 820, the method includes adding entries to associated stage lists for hardware instances that are supported by the driver, but are not associated with a current or prior stage of initialization. Upon initializing the GPS sensor and the dependent services, the navigation application may be launched via the HMI at 822.

The systems and methods described above also provide for a method of selectively loading classes during an initialization of an operating system of a computing device, the method comprising initializing a virtual machine, loading classes selected from a first class list, loading resources of the computing device, loading a service-loading process configured to initialize services of the operating system and register the services with a service manager, and loading classes selected from a second class list after loading the service-loading process. In a first example of the method, each class in the first class list may additionally or alternatively have a load time that is less than a load time threshold and may be utilized by a number of processes that is greater than a processes threshold. A second example of the method optionally includes the first example, and further includes wherein each class in the second class list has a load time that is greater than the load time threshold and is utilized by a number of processes that is greater than the processes threshold. A third example of the method optionally includes one or more of the first and second examples, and further includes waiting on a socket to receive a command to fork applications, and forking a requested application to load the requested application responsive to receiving a command to fork the requested application. A fourth example of the method optionally includes one or more of the first through the third examples, and further includes wherein loading the service-loading process further comprises loading only critical services with the service-loading process prior to launching a human-machine interface. A fifth example of the method optionally includes one or more of the first through the fourth examples, and further includes launching the human-machine interface and launching a last-used application via the human-machine interface. A sixth example of the method optionally includes one or more of the first through the fifth examples, and further includes launching applications responsive to a request to launch the application. A seventh example of the method optionally includes one or more of the first through the sixth examples, and further includes receiving a request from an application for a requested service at a service manager of the computing device, determining if the requested service is already running on the computing device, starting the requested service if the requested service is not already running, and returning a service handle associated with the requested service to the application if the requested service is running. An eighth example of the method optionally includes one or more of the first through the seventh examples, and further includes receiving a notification of a driver that is to be used, initializing the driver, and selectively initializing hardware instances supported by the driver. A ninth example of the method optionally includes one or more of the first through the eighth examples, and further includes wherein selectively initializing hardware instances supported by the driver comprises determining a stage of initialization associated with each hardware instance supported by the driver and, for each hardware instance that is associated with a first stage of initialization, initializing that hardware instance. A tenth example of the method optionally includes one or more of the first through the ninth examples, and further includes wherein selectively initializing hardware instances supported by the driver further comprises, for each hardware instance that is not associated with a first stage of initialization, adding an entry for that hardware instance in an associated stage list that matches the stage associated with the hardware instance. An eleventh example of the method optionally includes one or more of the first through the tenth examples, and further includes, for each initialization stage after a first initialization stage, retrieving a stage list associated with that initialization stage and initializing each hardware instance included in the stage list associated with that initialization stage.

The systems and methods described above also provide for a computing device comprising a processor, and a storage device storing instructions executable by the processor to initialize a virtual machine, load classes selected from a first class list, load resources of the computing device, load a service-loading process configured to initialize services of the operating system and register the services with a service manager, and load classes selected from a second class list after loading the service-loading process. In a first example of the computing device, the virtual machine may additionally or alternatively be a DALVIK virtual machine and the instructions may additionally or alternatively be further executable to call a Zygote process for loading the classes selected from the first class list. A second example of the computing device optionally includes the first example, and further includes wherein the computing device comprises an in-vehicle computing device integrated within a vehicle. A third example of the computing device optionally includes one or more of the first and second examples, and further includes wherein the service-loading process is configured to load new applications responsive to detecting commands for the new applications via an inter-process communication socket. A fourth example of the computing device optionally includes one or more of the first through the third examples, and further includes wherein each class in the first class list has a load time that is less than a load time threshold and is utilized by a number of processes that is greater than a processes threshold and each class in the second class list has a load time that is greater than the load time threshold and is utilized by a number of processes that is greater than the processes threshold.

The systems and methods described above also provide for an in-vehicle computing device comprising a processor including one or more processing cores, and a storage device storing instructions for initializing an operating system of the in-vehicle computing device, the instructions being executable by the processor to initialize a virtual machine, load each class of a first class list using a processor thread pool, a number of threads in the processor thread pool being based on a number of processor cores included in the processor, load resources of the in-vehicle computing device using the processor thread pool, load a service-loading process configured to initialize services of the operating system and register the services with a service manager, and load classes selected from a second class list only after loading the service-loading process using the processor thread pool. In a first example of the in-vehicle computing device, loading each class of the first class list may additionally or alternatively include simultaneously loading a number of classes from the first list that is equal to the number of threads in the processor thread pool multiplied by two. A second example of the in-vehicle computing device optionally includes the first example, and further includes wherein the instructions are further executable to receive a notification of a driver that is to be used, initialize the driver, and selectively initialize hardware instances supported by the driver. A third example of the in-vehicle computing device optionally includes one or more of the first and the second examples, and further includes wherein the instructions to load each class of the first class list include instructions to load only classes of the first class list, and not any classes of the second class list, and wherein the instruction to load classes from the second class list include instructions to load only classes from the second class list, and not any classes of the first class list.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the in-vehicle computing system 109 described with reference to FIG. 1. The methods may be performed by executing stored instructions with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. For example, although many illustrative examples are described with reference to ANDROID operating systems and in-vehicle computing devices, it is to be understood that the above-described methods and systems may be included in and/or utilized by any suitable hardware (e.g., a portable computing device, smartphone, tablet, laptop, a desktop computing device, a server computing system, etc.) and/or operating system. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A method of selectively loading classes during an initialization of an operating system of a computing device, the method comprising:
  detecting a trigger for initializing a virtual machine; and
  responsive to detecting the trigger for initializing the virtual machine:

loading classes selected from a first class list;
loading resources of the computing device;
loading a service-loading process configured to initialize services of the operating system and register the services with a service manager; and
loading classes selected from a second class list after loading the service-loading process, wherein classes are determined to be included in the first class list or the second class list based on at least one of respective load times of the classes, a respective number of processes that use the classes, and respective parameters indicating respective priorities of the classes.

2. The method of claim 1, wherein each class in the first class list has a load time that is less than a load time threshold and is utilized by a number of processes that is greater than a threshold number of processes.

3. The method of claim 1, wherein each class in the second class list has a load time that is greater than a load time threshold and is utilized by a number of processes that is greater than a threshold number of processes.

4. The method of claim 1, further comprising waiting on a socket to receive a command to fork applications, and forking a requested application to load the requested application responsive to receiving a command to fork the requested application.

5. The method of claim 1, wherein loading the service-loading process further comprises loading only critical services with the service-loading process prior to launching a human-machine interface.

6. The method of claim 5, further comprising launching the human-machine interface and launching a last-used application via the human-machine interface.

7. The method of claim 1, wherein the classes are determined to be included in the first class list or the second class list based on the respective load times of the classes and the respective parameters indicating the respective priorities of the classes, the method further comprising launching applications responsive to a request to launch the applications.

8. The method of claim 1, further comprising receiving a request from an application for a requested service at the service manager of the computing device, determining if the requested service is already running on the computing device, starting the requested service if the requested service is not already running, and returning a service handle associated with the requested service to the application if the requested service is running.

9. The method of claim 1, further comprising receiving a notification of a driver that is to be used, initializing the driver, and selectively initializing hardware instances supported by the driver based on a respective stage of initialization in which each of the hardware instances is designated as being used.

10. The method of claim 9, wherein selectively initializing hardware instances supported by the driver comprises determining the respective stage of initialization associated with each hardware instance supported by the driver and, for each hardware instance that is associated with a first stage of initialization, initializing that hardware instance.

11. The method of claim 10, wherein selectively initializing hardware instances supported by the driver further comprises, for each hardware instance that is not associated with the first stage of initialization, adding an entry for that hardware instance in an associated stage list that matches the initialization stage associated with the hardware instance.

12. The method of claim 11, further comprising, for each initialization stage after the first initialization stage, retrieving a stage list associated with the respective initialization stage and initializing each hardware instance included in the stage list associated with the respective initialization stage.

13. A computing device comprising:
a processor; and
a storage device storing instructions executable by the processor to:
detect a trigger for initializing a virtual machine; and
responsive to detecting the trigger for initializing the virtual machine:
load classes selected from a first class list;
load resources of the computing device;
load a service-loading process configured to initialize services of the operating system and register the services with a service manager; and
load classes selected from a second class list after loading the service-loading process,
wherein each class in the first class list has a load time that is less than a load time threshold and is utilized by a number of processes that is greater than a threshold number of processes, and
wherein each class in the second class list has a load time that is greater than the load time threshold and is utilized by a number of processes that is greater than the threshold number of processes.

14. The computing device of claim 13, wherein the service-loading process is configured to load new applications responsive to detecting commands for the new applications via an inter-process communication socket.

15. The computing device of claim 13, wherein the computing device comprises an in-vehicle computing device integrated within a vehicle.

16. An in-vehicle computing device comprising:
a processor including one or more processing cores; and
a storage device storing instructions for initializing an operating system of the in-vehicle computing device, the instructions being executable by the processor to:
detect a trigger for initializing a virtual machine; and
responsive to detecting the trigger for initializing the virtual machine:
load each class of a first class list using a processor thread pool, a number of threads in the processor thread pool being based on a number of processor cores included in the processor;
load resources of the in-vehicle computing device using the processor thread pool;
load a service-loading process configured to initialize services of the operating system and register the services with a service manager; and
load classes selected from a second class list only after loading the service-loading process using the processor thread pool,
wherein each class in the first class list has a load time that is less than a load time threshold and is utilized by a number of processes that is greater than a threshold number of processes, and
wherein each class in the second class list has a load time that is greater than the load time threshold and is utilized by a number of processes that is greater than the threshold number of processes.

17. The in-vehicle computing device of claim 16, wherein loading each class of the first class list comprises simultaneously loading a number of classes from the first list that is equal to the number of threads in the processor thread pool multiplied by two.

18. The in-vehicle computing device of claim 16, wherein the instructions are further executable to receive a notification of a driver that is to be used, initialize the driver, and selectively initialize hardware instances supported by the driver.

19. The in-vehicle computing device of claim 16, wherein the instructions to load each class of the first class list include instructions to load only classes of the first class list, and not any classes of the second class list, and wherein the instruction to load classes from the second class list include instructions to load only classes from the second class list, and not any classes of the first class list.

* * * * *